United States Patent
Hellbusch (10) Patent No.: US 10,668,949 B1
(45) Date of Patent: Jun. 2, 2020

(54) SIX WHEEL ALL-WHEEL STEER TRAILER

(71) Applicant: James A. Hellbusch, Columbus, NE (US)

(72) Inventor: James A. Hellbusch, Columbus, NE (US)

( * ) Notice: Subject to any disclaimer, the term of this patent is extended or adjusted under 35 U.S.C. 154(b) by 0 days.

(21) Appl. No.: 16/690,605

(22) Filed: Nov. 21, 2019

(51) Int. Cl.
  *B62D 13/04* (2006.01)
  *B62D 7/16* (2006.01)
  *B62D 7/14* (2006.01)
  *B62D 13/02* (2006.01)

(52) U.S. Cl.
  CPC ............. *B62D 7/142* (2013.01); *B62D 13/02* (2013.01)

(58) Field of Classification Search
  CPC ........ B62D 7/142; B62D 7/144; B62D 13/02; B62D 13/04; B62D 13/025; B62D 13/00
  USPC ......................................................... 280/442
  See application file for complete search history.

(56) References Cited

U.S. PATENT DOCUMENTS

| | | | | |
|---|---|---|---|---|
| 1,938,120 A * | 12/1933 | Spohn | ..................... | B62D 13/02 280/100 |
| 2,750,208 A * | 6/1956 | Henry | ................. | B62D 53/0864 280/426 |
| 3,883,158 A * | 5/1975 | Fikse | ........................ | B60P 3/40 280/404 |
| 7,571,916 B2 | 8/2009 | Skiles | | |
| 7,926,833 B2 | 4/2011 | Hellbusch | | |
| 8,714,594 B1 * | 5/2014 | Hellbusch | ............ | A01D 75/002 280/140 |
| 9,769,981 B1 * | 9/2017 | Hellbusch | ............ | A01C 23/008 |
| 10,457,324 B1 * | 10/2019 | Hellbusch | .............. | B62D 7/142 |
| 2007/0090625 A1 * | 4/2007 | Skiles | ..................... | B62D 13/02 280/442 |
| 2011/0062680 A1 * | 3/2011 | Hellbusch | .............. | B62D 13/02 280/442 |
| 2015/0266505 A1 * | 9/2015 | Merkel | ................ | B62D 7/1518 180/411 |
| 2019/0270356 A1 * | 9/2019 | Swank, II | .............. | B62D 7/142 |

\* cited by examiner

*Primary Examiner* — Tony H Winner
(74) *Attorney, Agent, or Firm* — Dennis L. Thomte; Thomte Patent Law Office LLC (57) ABSTRACT

An all-wheel steer trailer having six wheels is disclosed. The trailer includes an elongated frame means having first and second frame members having forward and rearward ends. A pivotal axle support is positioned at the forward end of the trailer and has first and second wheels rotatably mounted thereto. An elongated tongue has its rearward end secured to the axle support for pivotally moving the axle support and the first and second wheels mounted thereon. A tandem axle assembly is mounted on the first and second frame members forwardly of the rearward ends thereof. The tandem axle assembly includes third, fourth, fifth and sixth wheels which are rotatably and pivotally secured to the frame means. When the first and second wheels are pivotally moved in one direction, the third, fourth, fifth and sixth wheels are pivoted in an opposite direction.

2 Claims, 10 Drawing Sheets

SIX WHEEL ALL-WHEEL STEER TRAILER

BACKGROUND OF THE INVENTION

Field of the Invention

This invention relates to an all-wheel steer trailer and more particularly to an all-wheel steer trailer which is ideally suited for use in the agricultural industry to support combine or forage harvester headers thereon or fertilizer tanks thereon. Even more particularly, this invention relates to an all-wheel steer trailer having a tandem axle assembly at the rearward end of the trailer to provide a six wheel all-wheel steer trailer.

Description of the Related Art

Dual axle trailers have long been provided wherein the front axle or axles and the rear axle or axles are pivoted in opposite directions relative to a main frame when the front axle or axles is pivoted in one direction or another so that the rear wheels track the front wheels. An all-wheel steer trailer is disclosed in U.S. Pat. No. 7,571,916. Applicant has previously received U.S. Pat. No. 7,926,833 which represented an improvement in the art. Applicant has just received U.S. Pat. No. 10,457,324 B1 which represents an improvement in the industry. The instant invention represents a further improvement in the art.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A six wheel all-wheel steer trailer is disclosed which includes a substantially horizontally disposed frame with a first frame member, having a forward end and a rearward end, and a second frame member, having a forward end and a rearward end. A first cross-member is secured to the first and second frame members at the forward ends thereof and a second cross-member is secured to the first and second frame members rearwardly of the first cross-member. The second cross-member has a vertically disposed opening formed therein. A plurality of cross-members are secured to the first and second frame members so as to extend therebetween in a horizontally spaced-apart manner rearwardly of the second cross-member.

The trailer of this invention includes a gooseneck hitch having a horizontally disposed upper hitch member having a rearward end, a forward end and a vertically disposed hitch member having an upper end and a lower end. The rearward end of the upper hitch member is secured to the first cross-member so as to extend forwardly therefrom. The upper end of the vertically disposed hitch member is secured to the forward end of the upper hitch member. A horizontally disposed plate is secured to the lower end of the vertically disposed hitch member. The plate at the lower end of the vertically disposed hitch member has a central opening formed therein. A vertically disposed king pin, having an upper end and a lower end, is disclosed with the upper end of the king pin being secured to the lower end of the vertically disposed hitch member and which extends downwardly therefrom through the central opening in the plate.

A front axle support is disclosed having a forward end, a rearward end, an upper end, a lower end, a first side and a second side. An elongated tongue, having a forward end and a rearward end, has its rearward end pivotally secured, about a horizontal axis, to the front axle support. A first wheel is rotatably secured to the front axle support at the first side thereof and a second wheel is rotatably secured to the front axle support at the second side thereof.

The plate at the lower end of the vertically disposed hitch member is rotatably positioned on the upper end of the front axle support whereby the king pin extends downwardly through the upper plate of the front axle support. The trailer of this invention also includes a turn plate assembly, having a forward end and a rearward end, with the turn plate assembly including a horizontally disposed base plate having a forward end, a rearward end, an inner end and an outer end. The turn plate assembly includes a horizontally disposed tube, having a forward end and a rearward end, at the inner end of the base plate. The turn plate assembly also includes a horizontally disposed support plate positioned above the tube. The turn plate assembly also includes a vertically disposed first spindle extending upwardly from the support plate thereof. The first spindle rotatably extends upwardly through the vertically disposed opening in the second cross-member. The trailer also includes an elongated steering rod, having a forward end and a rearward end, with the steering rod slidably extending through the tube in the turn plate assembly whereby the forward end of the steering rod is positioned forwardly of the tube of the turn plate assembly and so that the rearward end of the steering rod is positioned rearwardly of the tube of the turn plate assembly. The forward end of the steering rod is pivotally secured to the rearward end of the first axle support.

The trailer also includes an elongated first tie rod, having forward and rearward ends, with the forward end of the first tie rod being pivotally secured to the outer end of the base plate of the turn plate assembly. A first spindle support is secured to the first frame member forwardly of the rearward end thereof. A first spindle assembly is pivotally secured to the first spindle support about a vertical axis. The first spindle assembly includes a horizontally disposed first axle having inner and outer ends. The first axle is pivotally movable about a vertical axis with respect to the first frame member. A third wheel is rotatably mounted on the outer end of the first axle. The trailer also includes a second spindle support which is secured to the second frame member forwardly of the rearward end of the second frame member. A second spindle assembly is pivotally secured to the second spindle support about a vertical axis. The second spindle assembly includes a horizontally disposed second axle having inner and outer ends. The second axle is pivotally movable about a vertical axis with respect to the second frame member. A fourth wheel is rotatably mounted on the outer end of the second axle. The trailer also includes a third spindle support which is secured to the first frame member rearwardly of the first spindle support. A third spindle assembly is pivotally secured to the third spindle support about a vertical axis. The third spindle assembly includes a horizontally disposed third axle having inner and outer ends. The third axle is pivotally movable about a vertical axis with respect to the first frame member. A fifth wheel is rotatably mounted on the outer end of the third axle. The trailer further includes a fourth spindle support which is secured to the second frame member rearwardly of the second spindle support. A fourth spindle assembly is pivotally secured to the fourth spindle assembly about a vertical axis. The fourth spindle assembly includes a horizontally disposed fourth axle having inner and outer ends. The fourth axle is pivotally movable about a vertical axis with respect to the second frame member. A sixth wheel is rotatably mounted on the outer end of the fourth axle.

The rearward end of the first tie rod is pivotally secured about a vertical axis to the second axle. The trailer also includes an elongated second tie rod having first and second ends with the first end of the second tie rod being operatively pivotally secured to the first axle about a vertical axis. The second end of the second tie rod is operatively pivotally secured to the second axle about a vertical axis. The trailer also includes an elongated third tie rod having a forward end and a rearward end with the forward end of the third tie rod being pivotally secured, about a vertical axis, to the second axle. The rearward end of the third tie rod is pivotally secured, about a vertical axis, to the fourth axle. The trailer also includes an elongated fourth tie rod having a first end and a second end with the first end of the fourth tie rod being pivotally secured, about a vertical axis, to the third axle. The second end of the fourth tie rod is pivotally secured, about a horizontal axis, to the fourth axle.

Figure 1:
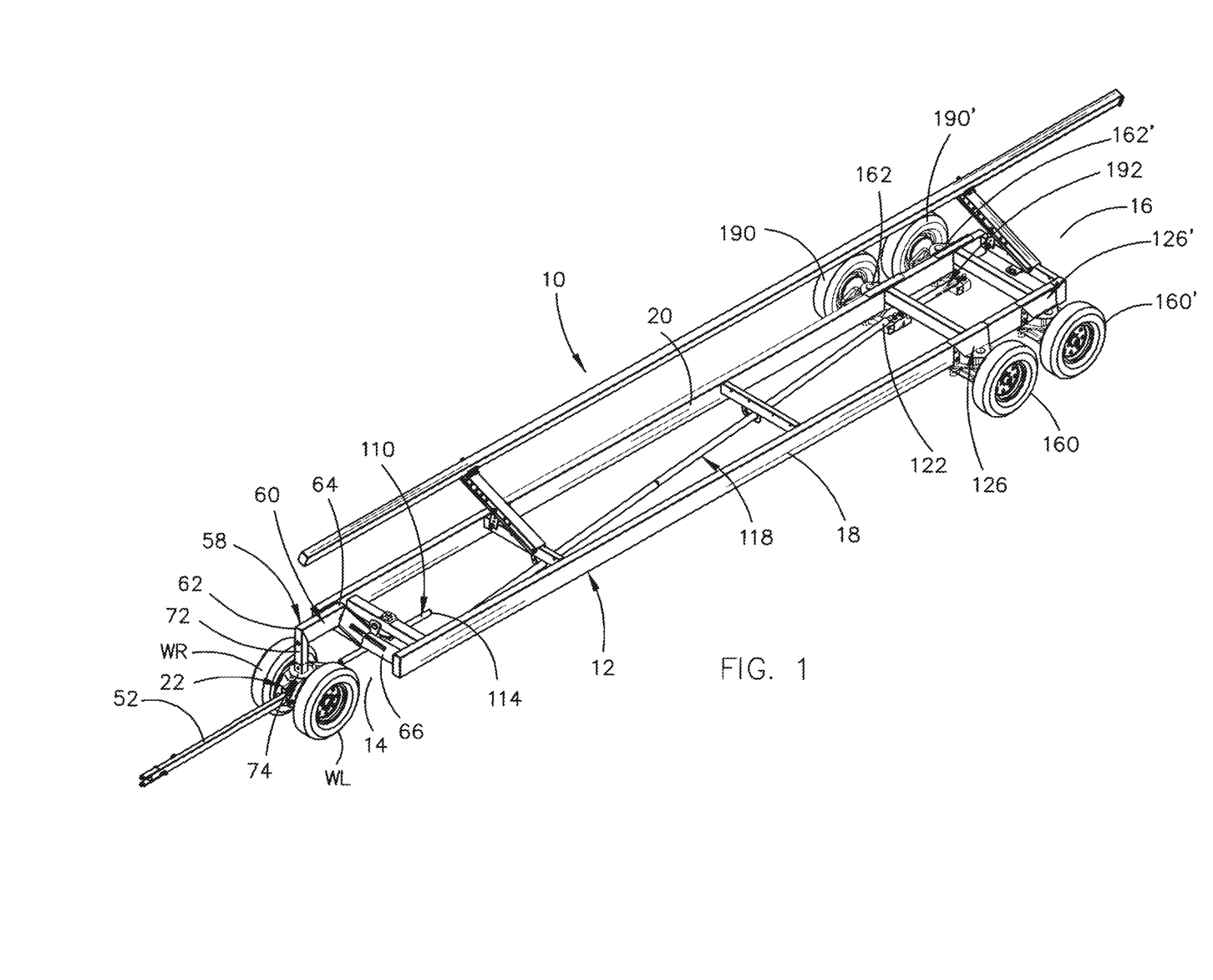
FIG. 1 is a perspective view of the trailer of this invention.
Figure 2:
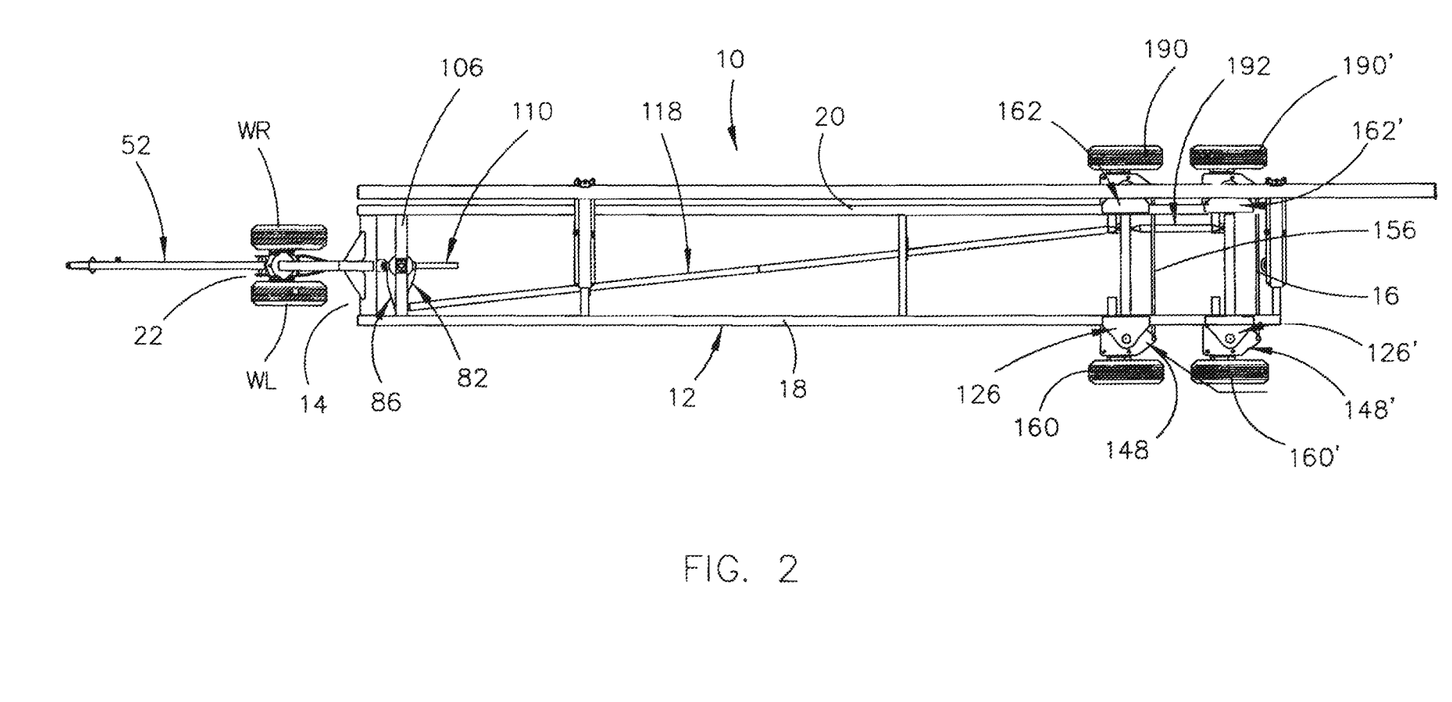
FIG. 2 is a top view of the trailer of this invention.
Figure 3:
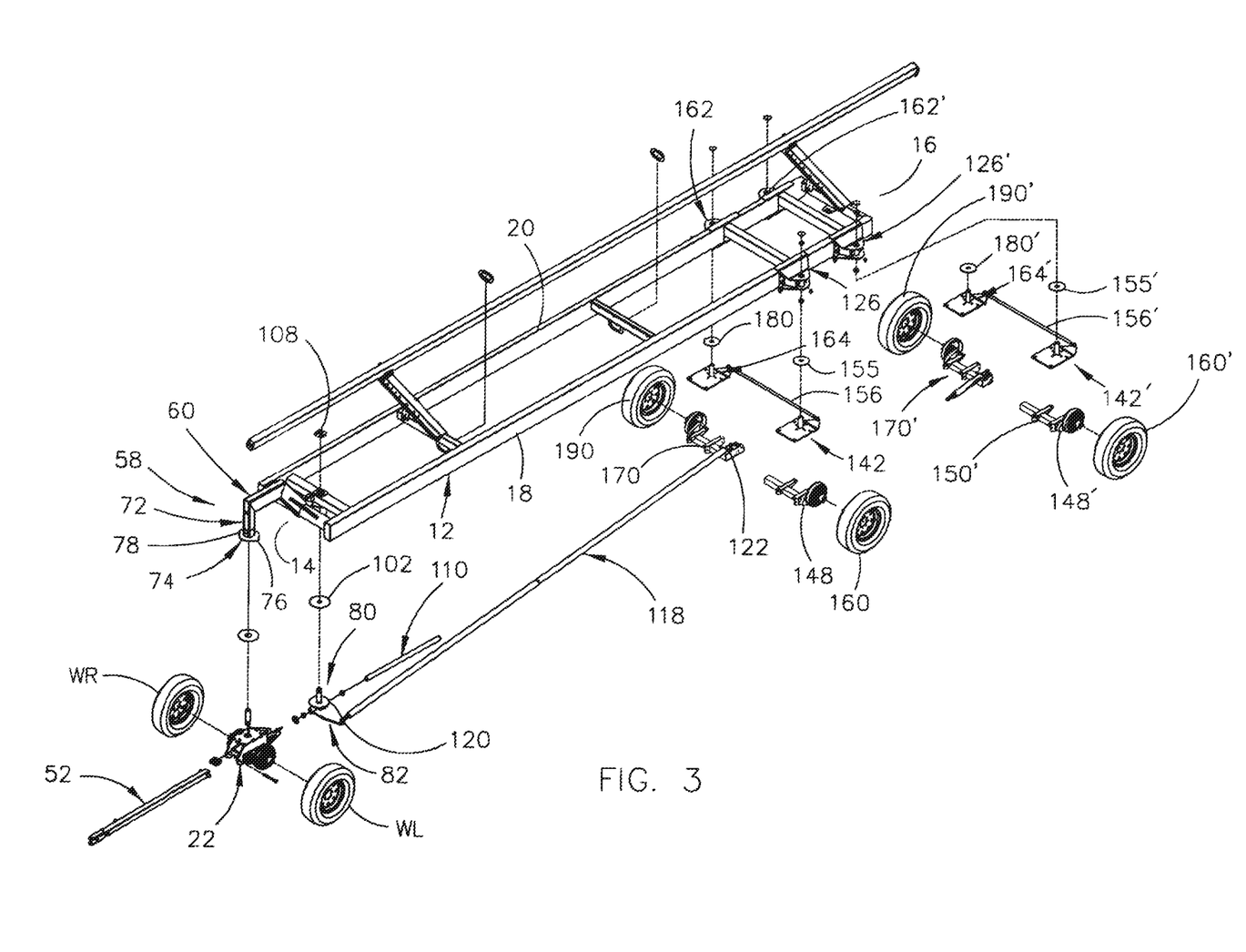
FIG. 3 is an exploded perspective view of the trailer of this invention.
Figure 4:
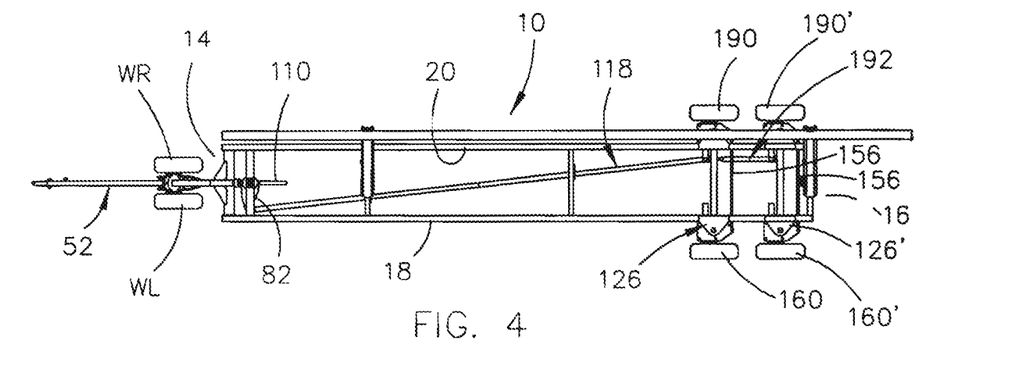
FIG. 4 is a top view of the trailer of this invention in a non-turning position.
Figure 5:
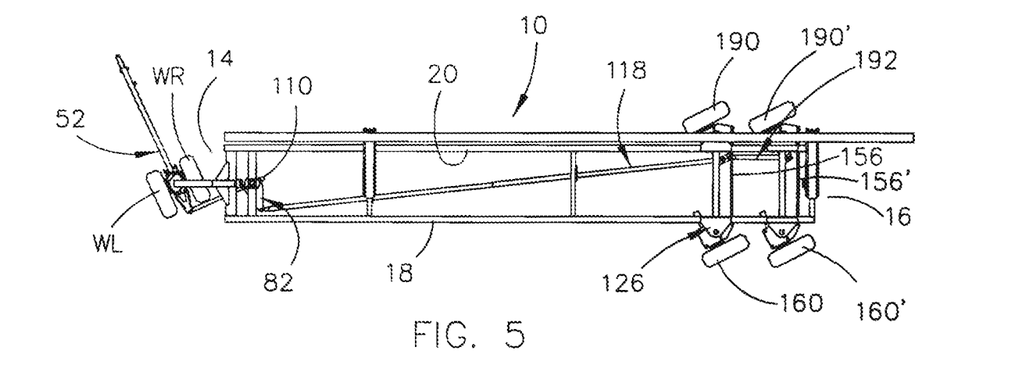
FIG. 5 is a top view of the trailer of this invention which is turning to the right.

When the tongue extends forwardly from the front axle support, the wheels WL and WR of the front axle support will be in the position of FIGS. 1, 2 and 4. If the tongue is turning to the right as viewed in FIG. 5, the third, fourth, fifth and sixth wheels will be in the position as seen in FIG. 5. If the tongue is pivoted to the position of FIG. 6, the third, fourth, fifth and sixth wheels will be in the position of FIG. 6.

It is therefore a principal object of the invention to provide a six wheel all-wheel steer trailer.

It is a further object of the invention to provide a six wheel all-wheel steer trailer which includes means for pivoting the tandem wheels of the trailer in response to the pivoting of the front wheels of the trailer to reduce the turning radius of the trailer.

It is therefore a principal object of the invention to provide an improved all-wheel steer trailer having six wheels.

It is a further object of the invention to provide a six wheel ail-wheel steer trailer which includes an improved means for pivoting the four rear wheels of the trailer in response to the pivoting of the front wheels of the trailer to reduce the turning radius of the trailer.

A further object of the invention is to provide an all-wheel steer trailer which includes a steering rod which extends through a secondary pivot area.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 9:
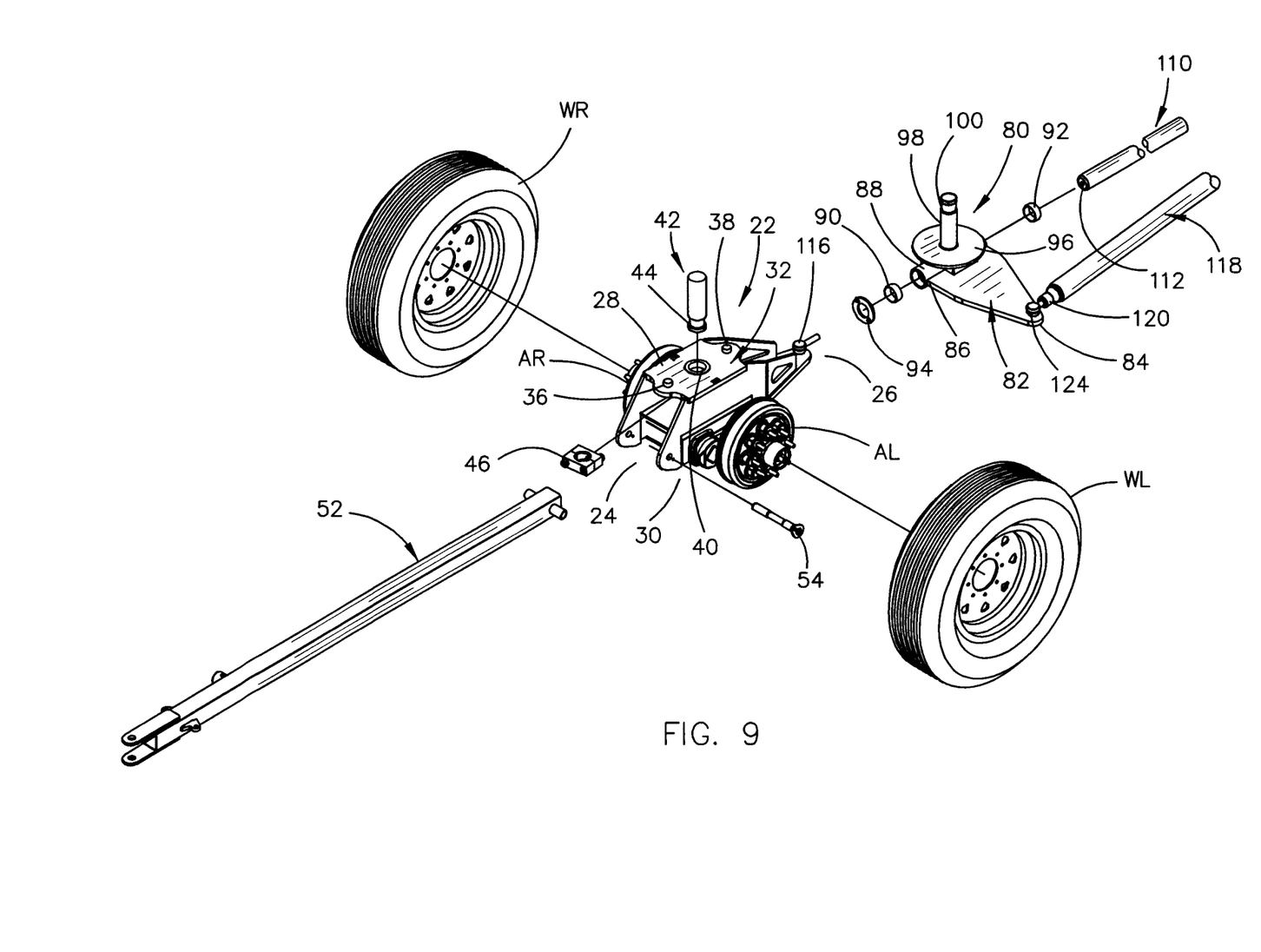
FIG. 9 is a partial exploded perspective view of the forward end of the trailer of this invention.
Figure 10:
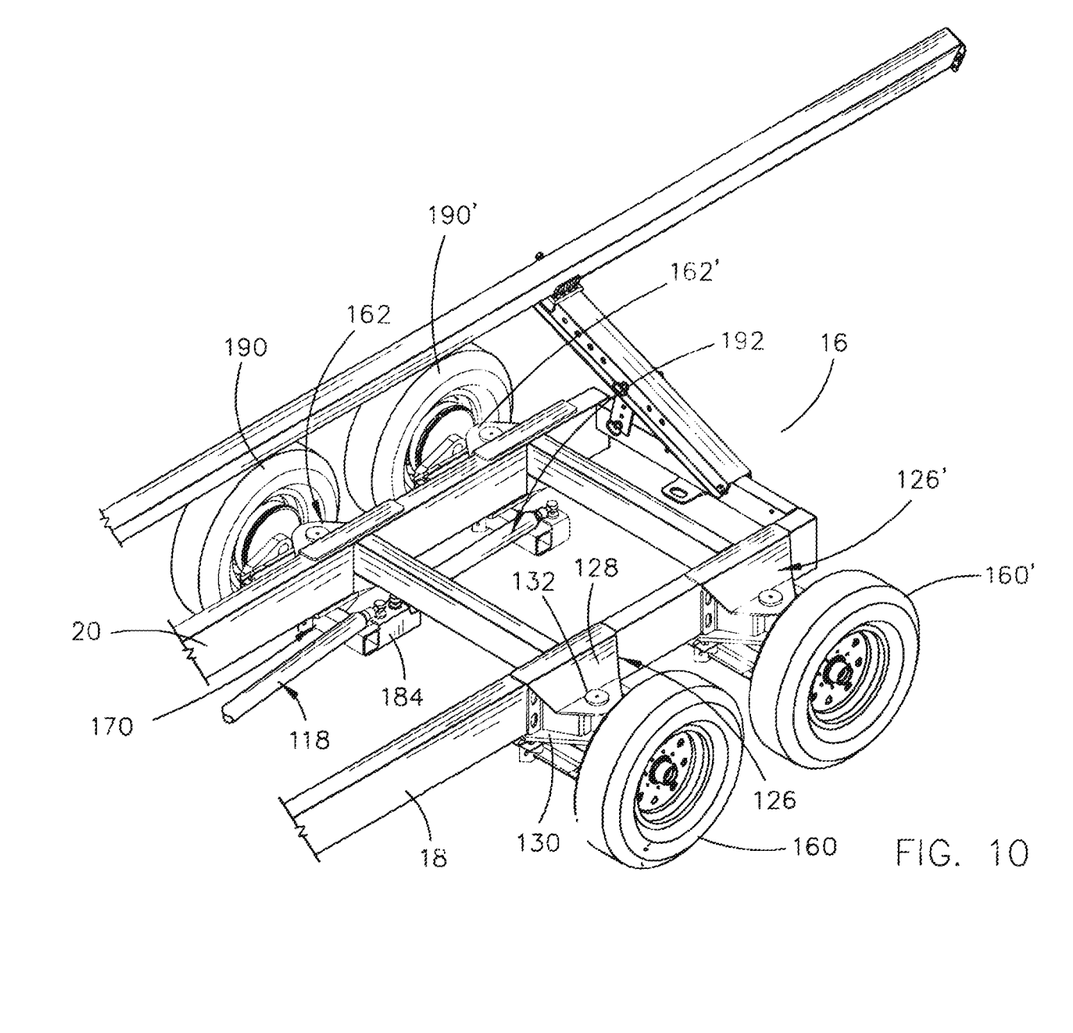
FIG. 10 is a partial perspective view of the rearward end of the trailer of this invention.

The numeral 10 refers to the six wheel steer trailer of this invention which includes a substantially horizontally disposed and elongated frame 12 having a forward end 14, a rearward end 16, a left frame member 18 and a right frame member 20. The numeral 22 refers to a front axle support having a forward end 24, a rearward end 26, an upper end 28 and a lower end 30. A horizontally disposed plate 32 is positioned at the upper end 28 of front axle support 22 as seen in FIG. 9. Plate 32 will be described as having a forward end 34. A stop 36 extends upwardly from plate 32 at the forward end thereof (FIG. 10). A stop 38 extends upwardly from plate 32 at the rearward end thereof (FIG. 10). Plate 32 has a central opening 40 formed therein (FIG. 10). The numeral 42 refers to a king pin which is received in opening 40. King pin 42 has an annular groove 44 at its lower end. A king pin lock block 46 embraces groove 44 of king pin 42 below plate 32 to maintain king pin 42 in plate 32. A wear pad 48 is positioned on plate 32. The rearward end 50 of an elongated tongue 52 is pivotally secured, about a horizontal axis, to front axle support 22 by a pivot pin 54. The forward end 56 of tongue 52 is configured to be secured to the hitch of a vehicle, such as a truck, tractor, etc. in conventional fashion.

Figure 7:
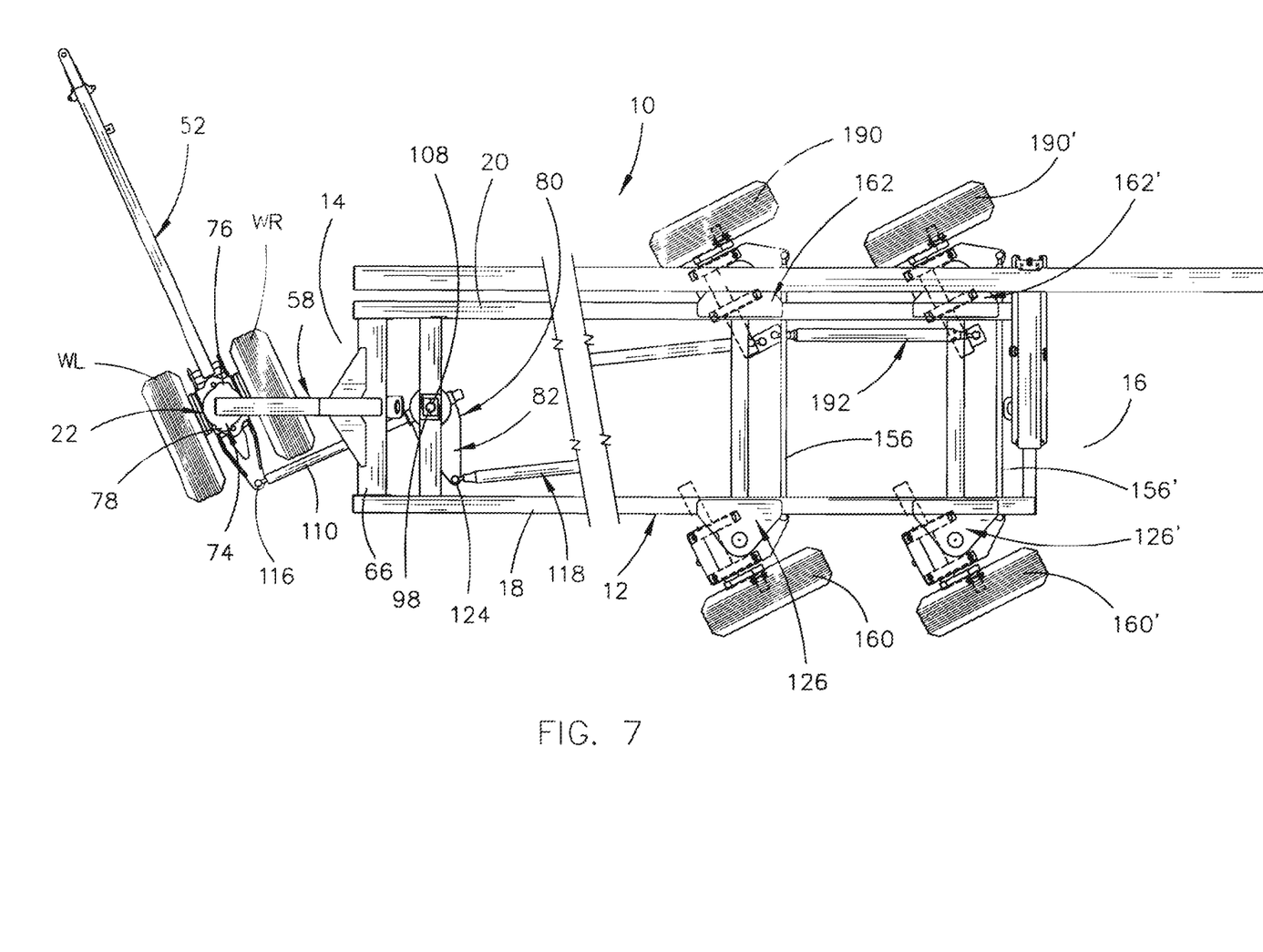
FIG. 7 is a partial top view of the trailer of this invention which is turning to the right.
Figure 8:
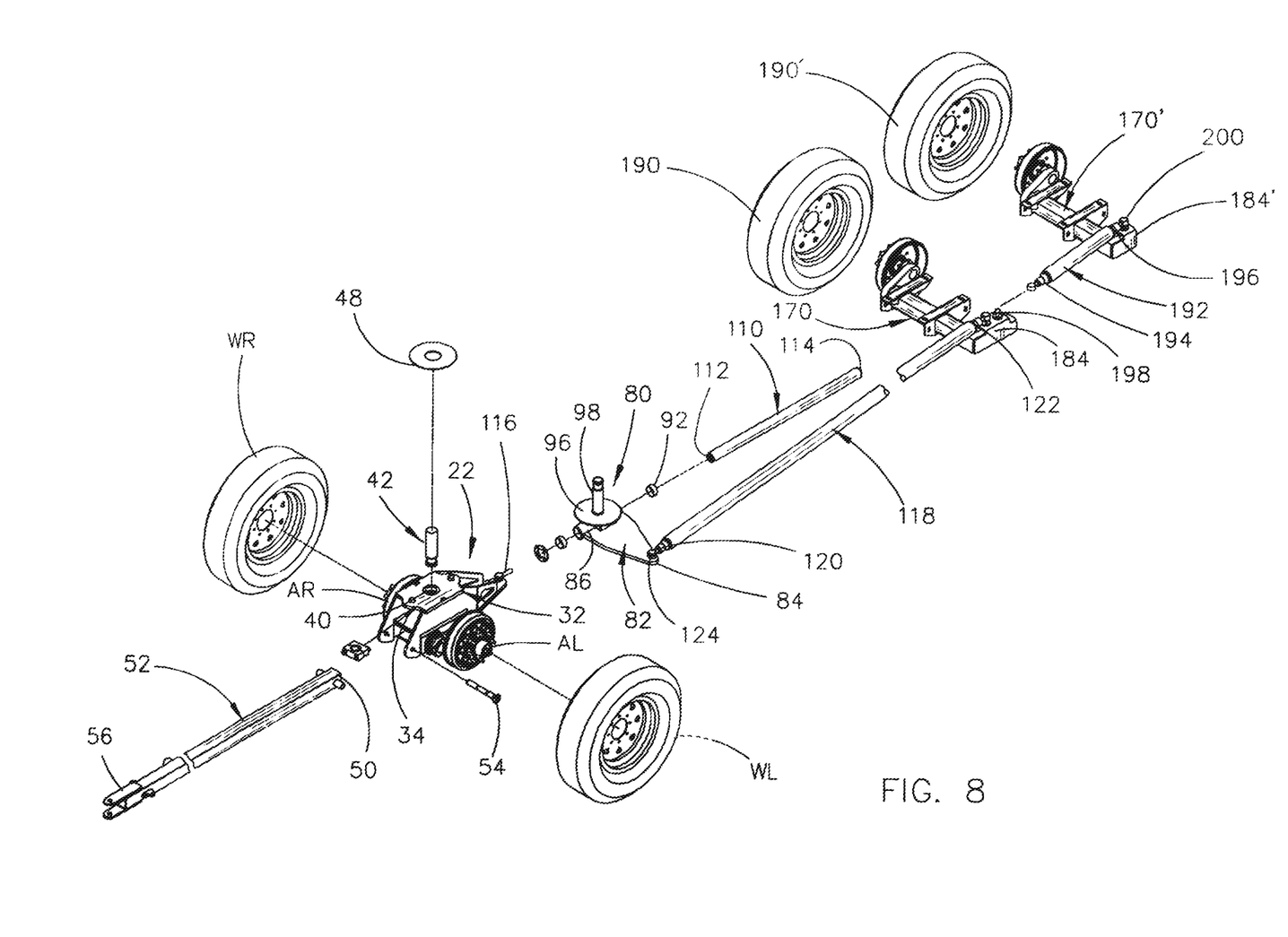
FIG. 8 is a partial exploded perspective view of the trailer of this invention.

Trailer 10 includes a gooseneck hitch 58 at the forward end thereof. Hitch 58 includes a horizontally disposed tubular hitch member 60 having a forward end 62 and a rearward end 64. The rearward end 64 of hitch member 60 is welded to a cross frame member 66 which is secured to the forward ends of frame members 68 and 70 of frame 12. Hitch 58 also includes a vertically disposed tubular hitch member 72 which is secured to the forward end 62 of hitch member 60 by welding and which extends downwardly therefrom. A connector plate 74 is welded to the lower end of hitch member 72 and has a pair of stops 76 and 78 extending therefrom with the stops 76 and 78 being approximately 180 degrees apart (FIG. 7). The upper end of king pin 42 is welded to the lower end of hitch member 72 and extends downwardly through plate 74, through wear pad 48 and into the opening 40 formed in plate 32. The plate 74, the hitch member 72 and king pin 42 are rotatable with respect to plate 32.

Axles AL and AR are mounted at the sides of front axle support 22 in conventional fashion and have wheels WL and WR rotatably mounted thereon respectively in conventional fashion.

The numeral 80 refers to a turn plate assembly which is positioned rearwardly of the front axle support 22. Assembly 80 includes a horizontally disposed base plate 82 having a left end 84 and a right end 86. Base plate 82 has a tube 88 welded thereto at end 86. Bushings 90 and 92 are positioned in the ends of tube 88 and are maintained therein by a bushing keeper 94. A horizontally disposed turn plate 96 is welded to the base plate 82 above tube 88. A vertically disposed king pin 98 is secured to the assembly 80 at the center of turn plate 96. King pin 98 has an annular recess 100 formed therein at its upper end.

The numeral 102 refers to a wear pad which embraces king pin 98 and is positioned on plate 96. King pin 98 extends upwardly through an opening 104 formed in crossmember 106 which extends between frame members 68 and 70 rearwardly of cross-member 66. A king pin lock 108 is secured to the upper end of king pin 98 to maintain king pin 98 in position.

The numeral 110 refers to an elongated steering rod having a forward end 112 and a rearward end 114. The forward end 112 of steering rod 110 is pivotally secured to a post 116 which is secured to the rearward end 26 of front axle support 22 and which extends upwardly therefrom. As seen, steering rod 110 slidably extends rearwardly through the tube 88 and the bushings 90 and 92 in tube 88.

The numeral 118 refers to an elongated first tie rod having a forward end 120 and a rearward end 122. The forward end 120 of tie rod 118 is pivotally secured to an upstanding post 124 which extends upwardly from base plate 82 at end 84 thereof.

The numeral 126 refers to a spindle support which is secured to frame member 18 forwardly of the rearward end of frame member 18. Spindle support 126 includes an upper plate 128 and a lower plate 130. Plate 128 has an opening 132 formed therein at the outer end thereof. Plate 130 has an opening 134 formed therein which is aligned with opening 132. A tube 136 is secured to plates 128 and 130 so that the tube 136 registers with openings 132 and 134. Bushings 138 and 140 are positioned in tube 136.

The numeral 142 refers to a spindle assembly which includes a mounting plate 144 and a spindle 146 which extends upwardly from plate 144. Plate 144 is fixedly secured to an axle 148 having an outer end 150 and an inner end 152. Plate 144 is secured to supports 153, which are secured to axle 148, by bolts or screws extending downwardly through openings in plate 144 and into openings formed in supports 153. Spindle 146 extends upwardly through the bushings 140 and 138 and the tube 136. A spindle bushing keeper 154 is secured to the upper end of spindle 146 and which has a larger diameter than the opening 132. As seen, a wear pad 155 is positioned on plate 146. A rear tie rod 156 has one end thereof pivotally secured to a post 158 which extends upwards from mounting plate 144. A wheel 160 is secured to the axle 148.

The numeral 162 refers to a spindle support which is secured to frame member 20 forwardly of the rearward end of frame member 20. Spindle support 162 is identical to spindle support 126 and will not be described in detail.

The numeral 164 refers to a spindle assembly which includes a mounting plate 166 and a spindle 168 which extends upwardly from plate 166. Plate 166 is fixedly secured to an axle 170 having an outer end 172 and an inner end 174. Axle 170 has a pair of supports 176 and 178 secured thereto. The plate 166 of spindle assembly 164 is secured to the supports 176 and 178 by bolts or screws. Spindle 168 extends upwardly through the wear pad 180 and bushings in the tube of spindle support 162. A spindle and bushing keeper 182 is secured to the upper end of spindle 168.

Figure 11:
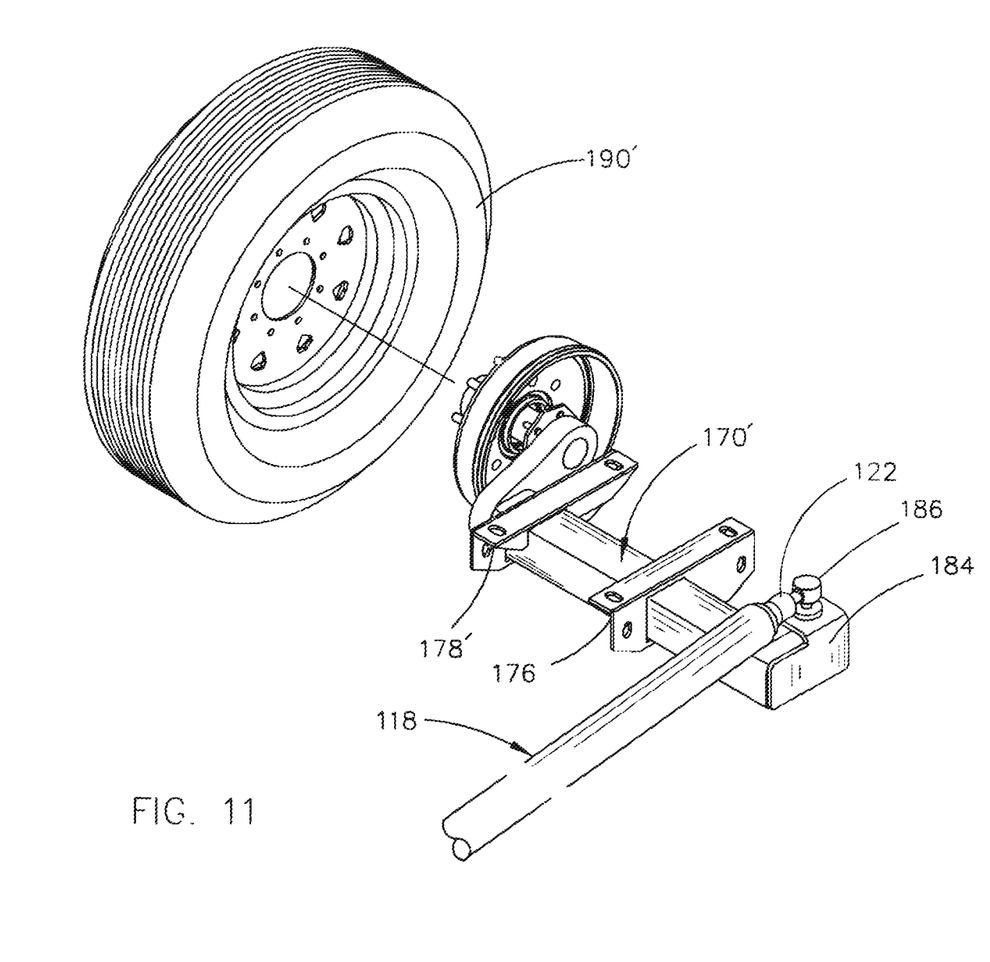
FIG. 11 is a partial exploded perspective view of the rearward end of the trailer of this invention.
Figure 12:
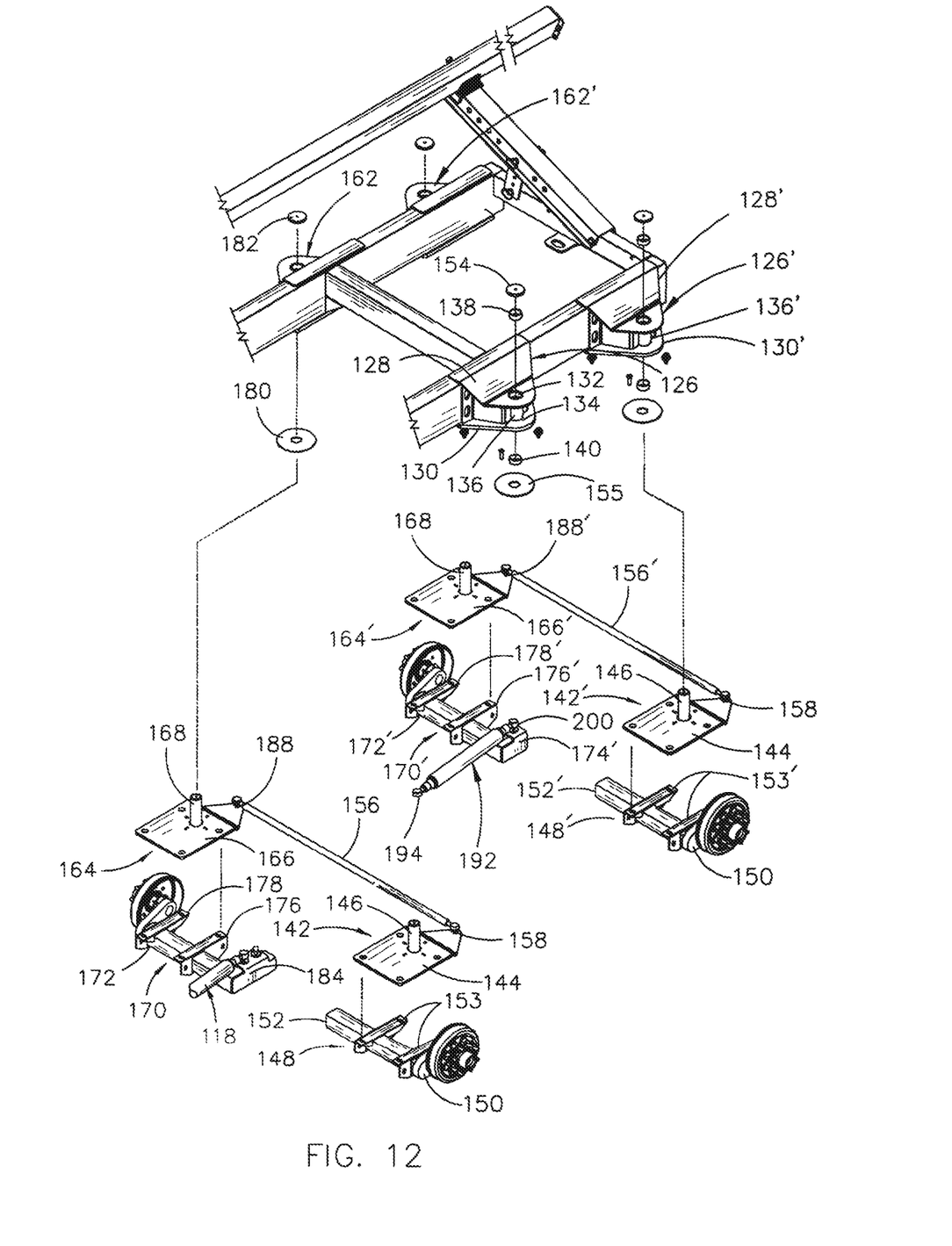
FIG. 12 is a partial exploded perspective view of the rearward end of the trailer of this invention.

Axle 170 has a bracket 184 secured to its inner end 174. A post 186 extends upwardly from bracket 184 as seen in FIG. 11. The rearward end 122 of the tie rod 118 is pivotally secured to the post 186 on bracket 184, The outer end of the rear tie rod 156 is pivotally secured to a post 188 which extends upwardly from mounting plate 166. A wheel 190 is secured to the outer end of axle 170.

Figure 6:
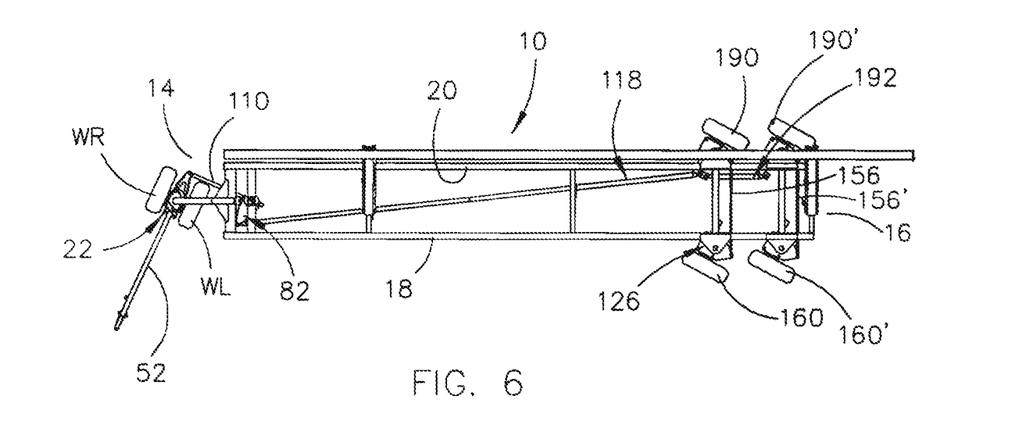
FIG. 6 is a top view of the trailer of this invention which is turning to the left.

As seen in FIG. 2, when the trailer 10 is traveling in a straight forward direction, the front wheels WL and WR are heading straight forwardly as are the wheels 160, 160', 190 and 190'. If the trailer 10 is turning to the right by the tongue 52, the wheels WL and WR are turned to the right as seen in FIG. 5. At that same time, the wheels 160, 160', 190 and 190' will be turned to the left as seen in FIG. 5. If the trailer 10 is turning to the left as seen in FIG. 6, the wheels WL and WR will be turned to the left and the wheels 160, 160', 190 and 190' will be turned to the right. The efficient turning of the rear wheels 160, 160', 190 and 190' results in the trailer 10 being able to negotiate sharp or regular corners. The steering rod 110 enables the efficient pivoting of the rear wheels 160, 160', 190 and 190' due to the offset connection of the tie rod 118 to a turn plate assembly 80.

The addition of the third spindle support, the third spindle assembly, the fourth spindle support, the fourth spindle assembly, the fifth wheel and the sixth wheel to the trailer enables the trailer to support very heavy headers thereon.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An all-wheel steer trailer, comprising:
a substantially horizontally disposed frame having a forward end, a rearward end, a first side and a second side;
said frame including:
(a) an elongated first frame member having a forward end and a rearward end;
(b) an elongated second frame member having a forward end and a rearward end which is horizontally spaced from said first frame member;
(c) a first cross-member secured to said first and second frame members at said forward ends thereof;
(d) a second cross-member secured to said first and second frame members rearwardly of said first cross-member;
(e) said second cross-member having a vertically disposed opening formed therein; and
(f) a plurality of cross-members secured to said first and second frame members so as to extend therebetween in a horizontally spaced-apart manner rearwardly of said second cross-member;

a gooseneck hitch having a horizontally disposed upper hitch member having a rearward end, a forward end and a vertically disposed hitch member having an upper end and a lower end;

said rearward end of said upper hitch member being secured to said first cross-member so as to extend forwardly therefrom;

said upper end of said vertically disposed hitch member being secured to said forward end of said upper hitch member;

a horizontally disposed plate secured to said lower end of said vertically disposed hitch member;

said plate at said lower end of said vertically disposed hitch member having a central opening formed therein;

a vertically disposed first king pin, having an upper end and a lower end;

said upper end of said first king pin being secured to said lower end of said vertically disposed hitch member and which extends downwardly therefrom through said central opening in said plate;

a front axle support having a forward end, a rearward end, an upper end, a lower end, a first side and a second side;

a horizontally disposed plate positioned on said upper end of said front axle support;

an elongated tongue having a forward end and a rearward end;

said rearward end of said tongue being pivotally secured, about a horizontal axis, to said front axle support;

a first wheel rotatably secured to said front axle support at said first side thereof;

a second wheel rotatably secured to said front axle support at said second side thereof;

said plate at said lower end of said vertically disposed hitch member being rotatably positioned on said upper end of said front axle support whereby said first king pin extends downwardly through said plate on said front axle support;

a turn plate assembly having a forward end and a rearward end;

said turn plate assembly including a horizontally disposed base plate having a forward end, a rearward end, an inner end and an outer end;

said turn plate assembly including a horizontally disposed tube, having a forward end and a rearward end, at said inner end of said base plate;

said turn plate assembly including a horizontally disposed support plate positioned above said tube;

said turn plate assembly also including a vertically disposed second king pin extending upwardly from said support plate thereof;

said second king pin rotatably extending upwardly through said vertically disposed opening in said second cross-member;

an elongated steering rod having a forward end and a rearward end;

said steering rod slidably extending through said tube in said turn plate assembly whereby said forward end of said steering rod is positioned forwardly of said tube of said turn plate assembly and so that said rearward end of said steering rod is positioned rearwardly of said tube of said turn plate assembly;

said forward end of said steering rod being pivotally secured to said rearward end of said front axle support;

an elongated first tie rod having forward and rearward ends;

said forward end of said first tie rod being pivotally secured to said outer end of said base plate of said turn plate assembly;

a first spindle support secured to said first frame member forwardly of said rearward end of said first frame member;

a first spindle assembly including a horizontally disposed first mounting plate having a forward end and a rearward end;

a vertically disposed first spindle having a lower end and an upper end;

said first spindle extending upwardly from said first mounting plate;

said first spindle pivotally interconnecting said first spindle assembly to said first spindle support about a vertical axis;

a horizontally disposed first axle having an inner end and an outer end;

said first axle being positioned below said first mounting plate and being secured thereto;

a third wheel rotatably mounted on said outer end of said first axle;

a second spindle support secured to said second frame member forwardly of said rearward end of said second frame member;

a second spindle assembly including a horizontally disposed second mounting plate having a forward end and a rearward end;

a vertically disposed second spindle having a lower end and an upper end;

said second spindle extending upwardly from said second mounting plate;

said second spindle pivotally interconnecting said second spindle assembly to said second spindle support about a vertical axis;

a horizontally disposed second axle having an inner end and an outer end;

said second axle being positioned below said second mounting plate and being secured thereto;

a fourth wheel rotatably mounted on said outer end of said second axle;

said rearward end of said first tie rod being pivotally secured to said inner end of said second axle about a vertical axis;

an elongated second tie rod having a first end and a second end;

said first end of said second tie rod being pivotally secured, about a vertical axis, to said rearward end of said first mounting plate;

said second end of said second tie rod being pivotally secured, about a vertical axis, to said rearward end of said second mounting plate;

a third spindle support secured to said first frame member rearwardly of said second spindle support;

a third spindle assembly including a horizontally disposed third mounting plate having a forward end and a rearward end;

a vertically disposed third spindle having upper and lower ends;

said third spindle extending upwardly from said third mounting plate;

said third spindle pivotally interconnecting said third spindle assembly to said third spindle support about a vertical axis;

a horizontally disposed third axle having an inner end and an outer end;

said third axle being positioned below said third mounting plate and being secured thereto;
a fifth wheel rotatably mounted on said outer end of said fifth axle;
a fourth spindle support secured to said second frame member rearwardly of said second spindle support;
a fourth spindle assembly including a horizontally disposed fourth mounting plate having a forward end and a rearward end;
a vertically disposed fourth spindle having upper and lower ends;
said fourth spindle extending upwardly from said fourth mounting plate;
said fourth spindle pivotally interconnecting said fourth spindle assembly to said fourth spindle support;
a horizontally disposed fourth axle having an inner end and an outer end;
said fourth axle being positioned below said fourth mounting plate and being secured thereto;
a sixth wheel rotatably mounted on said outer end of said fourth axle;
an elongated third tie rod having a forward end and a rearward end;
said forward end of said third tie rod being pivotally secured, about a vertical axis, to said inner end of said second axle;
said rearward end of said third tie rod being pivotally secured, about a vertical axis, to said inner end of said fourth axle;
an elongated fourth tie rod having a first end and a second end;
said first end of said fourth tie rod being pivotally secured, about a vertical axis, to said rearward end of said third mounting plate; and
said second end of said fourth tie rod being pivotally secured, about a vertical axis, to said rearward end of said fourth mounting plate.

2. A combine or forage harvester header trailer, comprising:
a substantially horizontally disposed frame having a forward end, a rearward end, a first side and a second side;
said frame including:
(a) an elongated first frame member having a forward end and a rearward end;
(b) an elongated second frame member having a forward end and a rearward end which is horizontally spaced from said first frame member;
a plurality of cross-members secured to said first and second frame members in a spaced-apart manner;
a gooseneck hitch secured to said forward ends of said first and second frame members;
a front axle support having a forward end, a rearward end, an upper end, a lower end, a first side and a second side;
said front axle support being pivotally secured to said gooseneck hinge about a vertical axis;
an elongated tongue having a forward end and a rearward end;
said rearward end of said tongue being pivotally secured, about a horizontal axis, to said front axle support;
a first wheel rotatably secured to said front axle support at said first side thereof;
a second wheel rotatably secured to said front axle support at said second side thereof;
an elongated first tie rod having forward and rearward ends;
a first spindle support secured to said first frame member forwardly of said rearward end of said first frame member;
a first spindle assembly including a horizontally disposed first mounting plate having a forward end and a rearward end;
a vertically disposed first spindle having a lower end and an upper end;
said first spindle extending upwardly from said first mounting plate;
said first spindle pivotally interconnecting said first spindle assembly to said first spindle support about a vertical axis;
a horizontally disposed first axle having an inner end and an outer end;
said first axle being positioned below said first mounting plate and being secured thereto;
a third wheel rotatably mounted on said outer end of said first axle;
a second spindle support secured to said second frame member forwardly of said rearward end of said second frame member;
a second spindle assembly including a horizontally disposed second mounting plate having a forward end and a rearward end;
a vertically disposed second spindle having a lower end and an upper end;
said second spindle extending upwardly from said second mounting plate;
said second spindle pivotally interconnecting said second spindle assembly to said second spindle support about a vertical axis;
a horizontally disposed second axle having an inner end and an outer end;
said second axle being positioned below said second mounting plate and being secured thereto;
a fourth wheel rotatably mounted on said outer end of said second axle;
said rearward end of said first tie rod being pivotally secured to said inner end of said second axle about a vertical axis;
an elongated second tie rod having a first end and a second end;
said first end of said second tie rod being pivotally secured, about a vertical axis, to said rearward end of said first mounting plate;
said second end of said second tie rod being pivotally secured, about a vertical axis, to said rearward end of said second mounting plate;
a third spindle support secured to said first frame member rearwardly of said second spindle support;
a third spindle assembly including a horizontally disposed third mounting plate having a forward end and a rearward end;
a vertically disposed third spindle having upper and lower ends;
said third spindle extending upwardly from said third mounting plate;
said third spindle pivotally interconnecting said third spindle assembly to said third spindle support about a vertical axis;
a horizontally disposed third axle having an inner end and an outer end;
said third axle being positioned below said third mounting plate and being secured thereto;
a fifth wheel rotatably mounted on said outer end of said fifth axle;

a fourth spindle support secured to said second frame member rearwardly of said second spindle support;

a fourth spindle assembly including a horizontally disposed fourth mounting plate having a forward end and a rearward end;

a vertically disposed fourth spindle having upper and lower ends;

said fourth spindle extending upwardly from said fourth mounting plate;

said fourth spindle pivotally interconnecting said fourth spindle assembly to said fourth spindle support;

a horizontally disposed fourth axle having an inner end and an outer end;

said fourth axle being positioned below said fourth mounting plate and being secured thereto;

a sixth wheel rotatably mounted on said outer end of said fourth axle;

an elongated third tie rod having a forward end and a rearward end;

said forward end of said third tie rod being pivotally secured, about a vertical axis, to said inner end of said second axle;

said rearward end of said third tie rod being pivotally secured, about a vertical axis, to said inner end of said fourth axle;

an elongated fourth tie rod having a first end and a second end;

said first end of said fourth tie rod being pivotally secured, about a vertical axis, to said rearward end of said third mounting plate; and said second end of said fourth tie rod being pivotally secured, about a vertical axis, to said rearward end of said fourth mounting plate.

* * * * *